United States Patent [19]

Polk et al.

[11] E Re. 30,106

[45] Reissued * Oct. 2, 1979

[54] METHOD OF PRODUCING AMORPHOUS CUTTING BLADES

[75] Inventors: Donald E. Polk, Boston, Mass.; Robert C. Morris, Ledgewood, N.J.

[73] Assignee: Allied Chemical Corporation, Morris Township, Morris County, N.J.

[ * ] Notice: The portion of the term of this patent subsequent to Mar. 18, 1992, has been disclaimed.

[21] Appl. No.: 879,314

[22] Filed: Feb. 21, 1978

Related U.S. Patent Documents

Reissue of:

[64] Patent No.: 3,940,293
Issued: Feb. 24, 1976
Appl. No.: 544,164
Filed: Jan. 27, 1975

U.S. Applications:

[62] Division of Ser. No. 317,039, Dec. 20, 1972, Pat. No. 3,871,836.

[51] Int. Cl.[2] ..... C21D 1/00; B26B 21/54; B32B 15/00

[52] U.S. Cl. ..... 204/23; 30/346.54; 75/122; 75/134 F; 75/170; 75/176; 428/661; 428/662; 428/666; 428/678

[58] Field of Search ..... 148/11.5 F, 12.1; 75/122, 134 F, 170, 176; 30/346.54; 428/661, 666, 662, 678; 204/23, 43 T, 43 P, 44, 43 R

[56] References Cited

U.S. PATENT DOCUMENTS 3,856,513 12/1974 Chen et al. ..... 75/122

*Primary Examiner*—Arthur J. Steiner
*Attorney, Agent, or Firm*—Ernest D. Buff; Gerhard H. Fuchs

[57] ABSTRACT

Metal alloys in an amorphous state are employed in the fabrication of cutting implements such as razor blades or knives. The implement may be formed from the amorphous metal or a coating of the amorphous metal may be applied. Such products may be formed from a ribbon of the amorphous metal alloy which has been prepared by quenching the molten metal or by coating the amorphous metal alloy on a suitable substrate such as by a sputtering procedure or vapor, chemical or electro-deposition of the alloy on the substrate.

12 Claims, 3 Drawing Figures

INTENSITY (ARBITRARY UNITS)
15° 16° 17° 18° 19° 20° 21° 22° 23° 24° 25°
2 θ
DIFFRACTION ANGLE ($M_O$ $K_\alpha$ RADIATION)

INTENSITY (ARBITRARY UNITS)
15° 16° 17° 18° 19° 20° 21° 22° 23° 24° 25°
2 θ
DIFFRACTION ANGLE ($M_O$ $K_\alpha$ RADIATION)

METHOD OF PRODUCING AMORPHOUS CUTTING BLADES

Matter enclosed in heavy brackets [ ] appears in the original patent but forms no part of this reissue specification; matter printed in italics indicates the additions made by reissue.

This is a division of application Ser. No. 317,039, filed Dec. 20, 1972, now U.S. Pat. No. 3,871,836.

DESCRIPTION OF PRIOR ART

The production of cutting implements by sharpening a piece of metal is an ancient art. Typically, the implement is fabricated from a crystalline metal which is formed to the desired shape and an edge is then ground to a reduced thickness.

It is recognized that the properties and hence usefulness of the blade are determined by the form of the edge and by the properties of the substance from which the blade is produced; these properties generally depend upon the processing of the metal as well as upon its chemical composition.

Scientific investigations have demonstrated that is is possible to obtain solid amorphous metals for certain alloy compositions, and as used herein, the term "amorphous" contemplates "solid amorphous." An amorphous substance generally characterizes a non-crystalline or glassy substance. In distinguishing an amorphous substance from a crystalline substance, diffraction measurements are generally suitably employed.

An amorphous metal produces a diffraction profile which varies slowly with the diffraction angle and is qualitatively similar to the diffraction profile of a liquid or ordinary window glass. For example, FIG. 1 is the first peak of the diffracted intensity I as a function of the diffraction angle $2\Theta$ for amorphous $Fe_{40}Ni_{40}P_{14}B_6$ as obtained from an x-ray diffractometer with MoK$\alpha$ radiation. Such a pattern is typical for amorphous metals. On the other hand, FIG. 2 represents the diffracted intensity I as a function of the diffraction angle $2\Theta$ for polycrystalline $Fe_{40}Ni_{40}P_{14}B_6$ over the same range of $2\Theta$. This more rapidly varying intensity is typical of crystalline materials.

These amorphous metals are in a metastable state. Upon heating to a sufficiently high temperature, they crystallize with the evolution of a heat of crystallization and the diffraction profile changes from one having the glassy or amorphous characteristics to one having crystalline characteristics.

Additionally, suitably employed transmission electron micrography and electron diffraction can be used to distinguish between the amorphous and the crystalline state.

It is possible to produce a metal which is a two-phase mixture of the amorphous and the crystalline state; the relative proportions can vary from totally crystalline to totally amorphous. An amorphous metal, as employed herein, refers to a metal which is primarily amorphous but may have a small fraction of the material present as included crystallites.

For a suitable composition, proper processing will produce a metal in the amorphous state. One typical procedure is to cause the molten alloy to be spread thinly in contact with a solid metal substrate such as copper or aluminum so that the molten metal looses its heat to the substrate.

When the alloy is spread to a thickness of ~0.002 inch, cooling rates of the order of $10^6$°C./sec are achieved. See, for example, R. C. Ruhl, Mat. Sci. & Eng. 1,313 (1967), which discusses the dependence of cooling rates upon the conditions of processing the molten metal. For an alloy of proper composition and for a sufficiently high cooling rate, such a process produces an amorphous metal. Any process which provides a suitably high cooling rate can be used. Illustrative examples of procedures which can be used to make the amorphous metals are the rotating double rolls described by H. S. Chen and C. E. Miller, Rev. Sci. Instrum. 41, 1237 (1970) and the rotating cylinder technique described by R. Pond, Jr. and R. Maddin, Trans. Met. Soc., AIME 245, 2475 (1969).

Alternatively, a deposition technique can be used to produce an amorphous metal. Two such techniques are vapor deposition and sputtering. In vapor deposition, the metal to be deposited is placed in a high vacuum and is heated to a temperature such that its vapor pressure is at least $10^{-2}$ mm Hg; this vapor is then condensed to the solid state on sufficiently cold surfaces exposed to the vapor. In sputtering, the metal to be deposited and the substrate upon which it is to be deposited are placed in a partial vacuum, usually of the order of 1 mm Hg. A high potential is applied between an electrode and the metal to be deposited, and the gaseous ions created by the high potential strike the surface of the metal with an energy sufficient to cause atoms from the metal to enter the vapor phase; these atoms then condense to the solid state on surfaces exposed to the vapor. Both the vapor deposition and the sputtering techniques are described in detail in Handbook of Thin Film Technology, L. I. Maissel and R. Glang, McGraw Hill, 1970. Similarly, chemical (electro-less) or electro-deposition of a suitable alloy composition from a solution can also lead to an amorphous alloy.

SUMMARY OF THE INVENTION

The invention has as its primary object the provision of cutting implements which are composed of, or are coated with, an amorphous metal.

Additional objects and advantages will be apparent from the specification and claims.

One class of cutting implements which is of particular interest is that typified by safety razor blades. A strip or sheet of an amorphous metal with a thickness of about 0.001 to 0.005 inch can be sharpened so as to produce a razor blade. Further treatment such as the sputtering on of a crystalline or amorphous metal coating or the application of a fluorocarbon coating may be used to produce the finished blade.

We have discovered that amorphous metals are exceptionally well-suited to use for razor blades since compositions with high as-formed hardness, ductility, a high elastic limit and good corrosion resistance can be selected. Additionally, these amorphous metals are more homogeneous than common crystalline materials for the dimensions characteristic of the sharpened edge of a razor blade. Greater hardness and better corrosion resistance than the stainless steel blades now in use can be achieved.

Strips from which the blades are made can be obtained by any of various techniques. Most suitable is the quenching from the melt of a continuous strip by, for example, using a pair of rotating rolls or by squirting the molten metal onto the outside of a rapidly rotating cylinder.

Additionally, razor blades can be produced which consist of sharpened crystalline metal or amorphous metal blades with an amorphous metal film deposited on top of the edge, for example, by sputtering.

Further, a blade can be produced by sharpening after the amorphous metal coating has been applied to a crystalline substrate, by sputtering or vapor deposition, for example.

Cutting blades such as common knives can be produced with an amorphous metal coating applied, for example, by sputtering or electro-deposition so as to improve the properties of the surface.

Cutting blades other than razor blades can also be produced by sharpening an amorphous metal strip or sheet. Further, a sandwich construction where the amorphous metal is held between two layers of a softer material could be used to make blades.

It has been found that metal alloys which are partially amorphous can sometimes also have the desirable properties of high hardness, high strength, high elastic limit, and ductility which can be obtained with the fully amorphous state. These alloys may be a mixture of the amorphous and crystalline states because of several possible reasons. The composition may be one which for obtainable quench rates or deposition parameters does not give a totally amorphous substance, or a relatively low quench rate may have been employed, or part of the sample may have been recrystallized upon a heat treatment of the sample. A typical x-ray diffraction pattern for such an amorphous-crystalline mixture is shown in FIG. 3. It is a superposition or summation of an amorphous pattern and a crystalline pattern. Resolving the two patterns and measuring the relative integrated intensities indicates the approximate relative percentages of the two structures. Additionally, transmission electron micrography and diffraction can also be used to estimate the percent of each phase. Further, the measured heat of crystallization will be proportional to the fraction that is amorphous.

The articles described above can be made from such an amorphous-crystalline mixture where the crystalline fraction is less than 50 percent.

DESCRIPTION OF THE PREFERRED EMBODIMENTS

Figure 1:
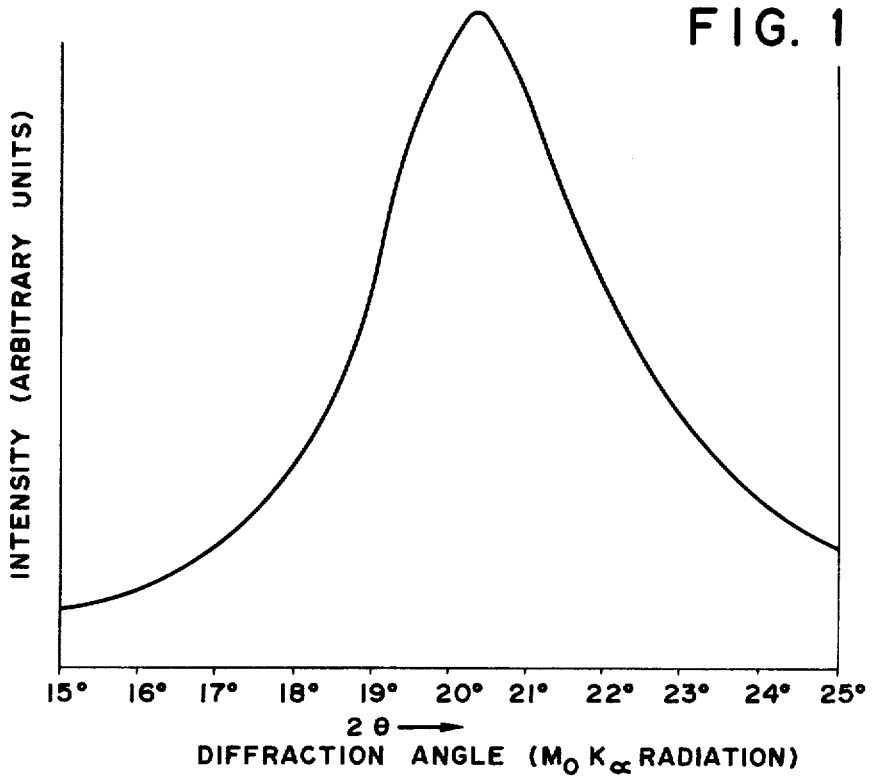
FIG. 1 illustrates the diffraction intensity of an amorphous $Fe_{40}Ni_{40}P_{14}B_6$ metal.
Figure 2:
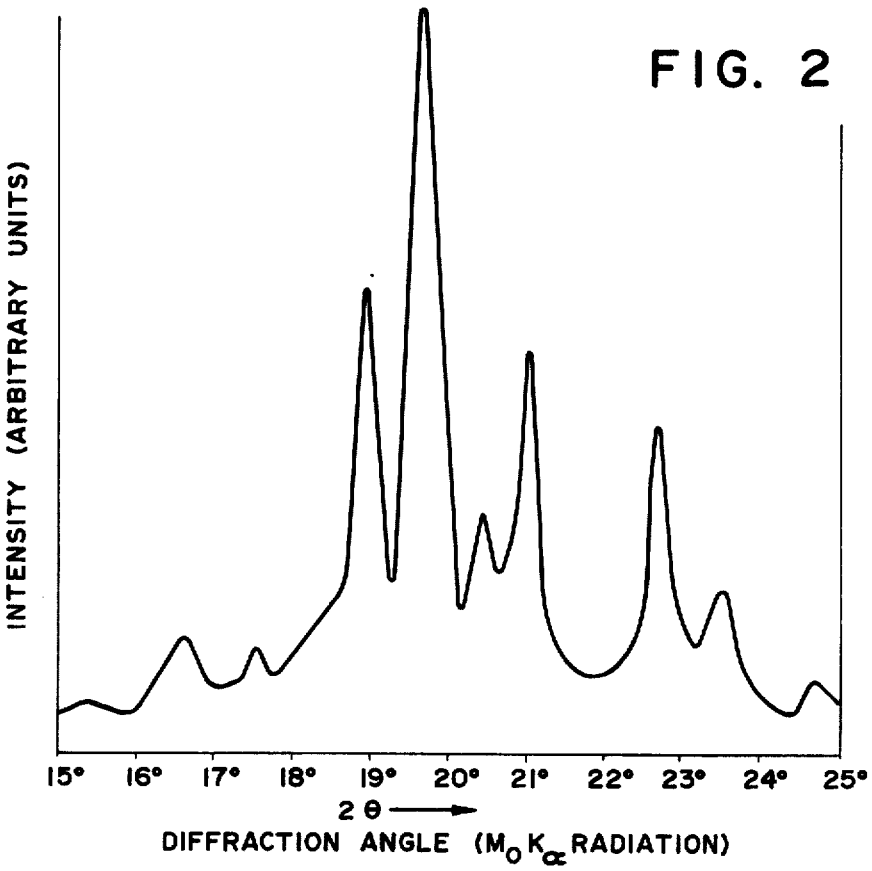
FIG. 2 illustrates the diffracted intensity of the cryatalline metal of $Fe_{40}Ni_{40}P_{14}B_6$.
Figure 3:
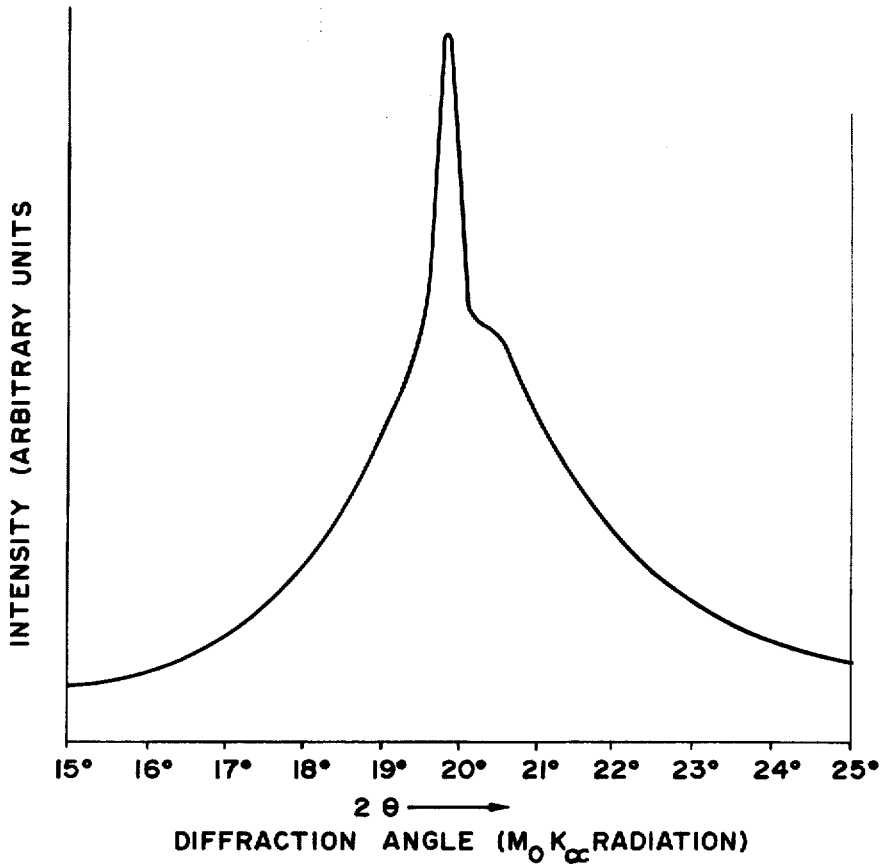
FIG. 3 is an x-ray diffraction pattern for a partially crystalline metal alloy of $Ni_{77}P_{14}B_6Al_3$.

In accordance with the invention, an amorphous metal strip can be sharpened to form razor blades of excellent edge characteristics: high resistance to mechanical damage and superior corrosion resistance. In production, for example, an amorphous metal strip which is 0.002 inch thick and about ¼ inch wide can be sharpened on one edge and then cut into lengths of about 1.75 inches. Alternatively, strips of greater width can be sharpened on both edges.

Strips of many different alloy compositions can be used for razor blades. The preferred alloys will consist of primarily iron, nickel, cobalt, chromium, vanadium and mixtures thereof. Alloys of particular interest contemplated by the invention are those having the general formula $M_aX_b$ wherein M may be any combination of Ni, Fe, Co, Cr and/or V, X will be elements such as P, B, C, Si, Al, Sb, Sn, In, Ge and/or Be and a and b represent atomic percent in which a will generally range from 90 to 65 atomic percent and b will range from 10 to 35 atomic percent. Preferably, a will vary from about 84 to about 73 atomic percent while b will vary from about 16 to about 27 atomic percent.

Examples of some of the preferred compositions include $Ni_{75}P_{16}B_6Al_3$; $Ni_{50}Fe_{28}P_{14}B_6Al_2$; $Cr_{24}Fe_{24}Ni_{30}P_{14}B_4C_2Si_2$; $Fe_{38}Cr_{38}P_{15}C_4B_2Al_3$; $Fe_{40}Ni_{40}P_{14}B_6$; and $Fe_{30}Co_{20}Cr_{28}P_{14}B_6Al_2$.

The alloying elements normally used in steels, such as Mo, Mn, Ti, W and Cu, can also be included in these compositions as a partial replacement for any of the metals Ni-Fe-Cr-Co-V. In replacing the latter with the former, preferably not more than about one-third of the latter metals in atomic percent is replaced with the former.

An alternate embodiment of the invention resides in coating a metal substrate with an amorphous metal layer such as by the sputtering of a thin film (about 50 to 300A thick) of metal which is at least 50 percent amorphous onto the edge of an already sharpened amorphous or crystalline razor blade. The general compositions of such coating alloys are essentially those listed above in connection with the amorphous strips. Preferred coating compositions are, for example, $Cr_{80}P_{15}B_5$; $Fe_{20}Cr_{60}P_{20}$; $Cr_{65}Ni_{10}P_{15}Si_{10}$ and $Cr_{77}P_{13}B_5Si_5$.

Still another embodiment resides in the deposition of an amorphous coating of the general compositions listed above on various articles of cutlery. For example, a composition such as $Ni_{80}P_{20}$ can be electro-deposited onto a formed utensil such as a knife or instead a composition such as $Cr_{60}Ni_{20}P_{15}B_5$ can be sputtered thereon.

The invention will be further described by reference to the following specific examples. It should be understood, however, that although these examples may describe in detail certain preferred operating conditions and/or materials and/or proportions, they are provided primarily for purposes of illustration and the invention, in its broader aspects, is not limited thereto. Parts expressed are parts by atomic percent unless otherwise stated.

EXAMPLE 1

A molten alloy of composition $Ni_{48}Fe_{30}P_{14}B_6Al_2$ at a temperature of 1050° C. is quenched to the amorphous state by using the rotating double roll apparatus described by Chen and Miller in Rev. Sci, Instrum. 41, 1237 (1970). An argon pressure of 8 psi is used to squirt the molten metal through a 0.010 inch hole in the bottom of a fused silica tube into the nip of the two inch diameter, three inch long double rolls which are at room temperature and rotating at about 1400 rpm. A force of about 100 lbs. is applied so as to push the rolls towards each other. The molten metal is thus quenched to a 0.002 inch thick ribbon of amorphous metal of the same composition. The edge of the ribbon is sheared off so as to provide a straight edge and a cutting edge is ground and honed on the sheared edge of the strip in a manner conventionally used to sharpen razor blades. In sharpening, care is taken such that any part of the metal strip does not reach a temperature above 340° C. The strips are cut to the desired length for individual blades. The blade may be suitably employed at this juncture. However, the blade may be further processed after sharpening such as by the deposition of an amorphous or crystalline metal film of about 150A on the cutting edge. This coating may be applied by sputtering or vapor deposition, as described in the aforementioned Maissel and Glang text. A fluorocarbon coating may also be applied such as disclosed in U.S. Pat. No. 3,071,856—care again being taken to avoid excess temperature which would cause crystallization of the amorphous metal.

EXAMPLE 2

A 0.004 inch thick strip of stainless steel is ground and honed to produce a razor blade with a conventionally shaped edge. An alloy of composition $Cr_{78}P_{14}B_5Si_3$ is sputtered onto the edge of the blade which is kept at a temperature below 100° C. in the manner described in Chapter 4 of the Maissel and Glang text, so as to produce a metal film of this alloy composition which is more than 50 percent amorphous and has an average thickness of 200 A on the edge of the blade. A fluorocarbon coating in the manner disclosed in Example 3 of U.S. Pat. No. 3,071,856 is applied to the blade.

A similar procedure was followed for a 0.002 inch thick blade of amorphous $Ni_{50}Fe_{28}P_{14}B_6Al_2$.

Similarly, $Cr_{58}Ni_{18}P_{14}B_6Si_4$ is sputtered onto other ground stainless steel and amorphous $Ni_{50}Fe_{28}P_{14}B_6Al_2$ blades which are then coated with a fluorocarbon.

EXAMPLES 3-8

Following the procedure of Example 1, amorphous strips suitable for forming of razor blades are prepared from the alloys shown in Table I. Some examples, as indicated, are coated.

TABLE I

| Example | Alloys (atomic %) | Coating (if any) |
|---|---|---|
| 3 | $Fe_{39}Ni_{39}P_{16}B_4Si_2$ | |
| 4 | $Fe_{39}Ni_{39}P_{16}B_4Si_2$ | $Cr_{80}P_{15}B_5$ (sputtered) |
| 5 | $Fe_{30}Ni_{20}Cr_{25}P_{14}B_6Al_2$ | $Cr_{65}Ni_{10}P_{15}Si_{10}$ (sputtered) and thereafter coated with polytetrafluoro-alkylene) |
| 6 | $FE_{38}Cr_{38}P_{15}C_4B_1Al_3$ | $Cr_{80}P_{15}B_3$ (sputtered) and thereafter coated with polytetrafluoro-ethylene |
| 7 | $Ni_{75}P_{16}B_4Si_1Al_2$ | $Cr_{80}P_{15}B_5$ (sputtered) and thereafter coated with polytetrafluoro-ethylene |
| 8 | $Cr_{40}CO_{36}P_{14}B_6Al_4$ | Cr (sputtered) |

EXAMPLE 9

A stainless steel knife with a high polish is cleaned by washing with trichloroethylene and dried. An amorphous film of $Cr_{80}P_{15}B_5$ is sputtered on the entire blade. The film thickness is 1000 A. A relatively tough and durable mar-resistant coating is produced.

We claim:

1. In a process of preparing a [metal] cutting implement [by shaping a metal strip into the desired implement form and sharpening a cutting edge on said implement], the improvement which comprises quenching a molten metal alloy under conditions producing [the] *a* metal strip in at least 50 percent amorphous state, said metal alloy having the composition represented by $M_aX_b$, where M is at least one element selected from the group consisting of Ni, Fe, Co, Cr and V, X is at least one element selected from the group consisting of P, B, C, Si, Al, Sb, Sn, In, Ge and Be, a ranges from 65 atomic percent to 90 atomic percent and b ranges from 10 atomic percent to 35 atomic percent.

2. In a method of fabricating a [metal] cutting implement from a metal substrate by depositing a metal film on said substrate, the improvement which comprises employing a metal film which is at least 50 percent amorphous and has the composition represented by $M_aX_b$, where M is at least one element selected from the group consisting of Ni, Fe, Co, Cr and V, X is at least one element selected from the group consisting of P, B, C, Si, Al, Sb, Sn, In, Ge and Be, a ranges from 65 atomic percent to 90 atomic percent and b ranges from 10 atomic percent to 35 atomic percent.

3. The process of claim 2 in which up to about one-third of M is replaced with at least one element selected from the group consisting of molybdenum, manganese, titanium, tungsten and copper.

4. The process of claim 1 in which up to about one-third of M is replaced with at least one element selected from the group consisting of molybdenum, manganese, titanium, tungsten and copper.

5. The method of claim 2 wherein the metal film is deposited on a sharpened metal substrate.

6. The method of claim 2 wherein the metal substrate is sharpened after the metal film is deposited.

7. The method of claim 2 for fabricating a metal cutting implement wherein the metal film is vacuum deposited onto the metal substrate to a thickness of about 50 to 300A.

8. The method of claim 2 for fabricating a metal cutting implement wherein the metal film is electrodeposited onto the metal substrate.

*9. The process of claim 1 wherein said metal strip is formed into a cutting implement.*

*10. The process of claim 9 wherein at least one edge of said cutting implement is sharpened.*

*11. In a process of preparing a cutting implement, the improvement which comprises quenching a molten metal alloy under conditions producing a metal strip in at least 50 percent amorphous state, said metal alloy having the composition represented by $M_aX_b$, where M is at least one element selected from the group consisting of Ni, Fe, Co, Cr, and V, up to about ⅓ of M being replaced by alloying elements normally used in steels, X is at least one element selected from the group consisting of P, B, C, Si, Al, Sb, Sn, In, Ge and Be, "a" ranges from 65 atomic percent to 90 atomic percent and "b" ranges from 10 atomic percent to 35 atomic percent.*

*12. In a method of fabricating a cutting implement from a metal substrate by depositing a metal film on said substrate, the improvement which comprises employing a metal film which is at last 50 percent amorphous and has the composition represented by $M_aX_b$, where M is at least one element selected from the group consisting of Ni, Fe, Co, Cr and V, up to about ⅓ of M being replaced by alloying elements normally used in steels, X is at least one element selected from the group consisting of P, B, C, Si, Al, Sb, Sn, In, Ge and Be, a ranges from 65 atomic percent to 90 atomic percent and b ranges from 10 atomic percent to 35 atomic percent.*

* * * * *